Oct. 5, 1948.
G. G. ZAHM
2,450,774
METHODS FOR THE EVAPORATION AND
CONCENTRATION OF LIQUIDS
Filed Aug. 12, 1943
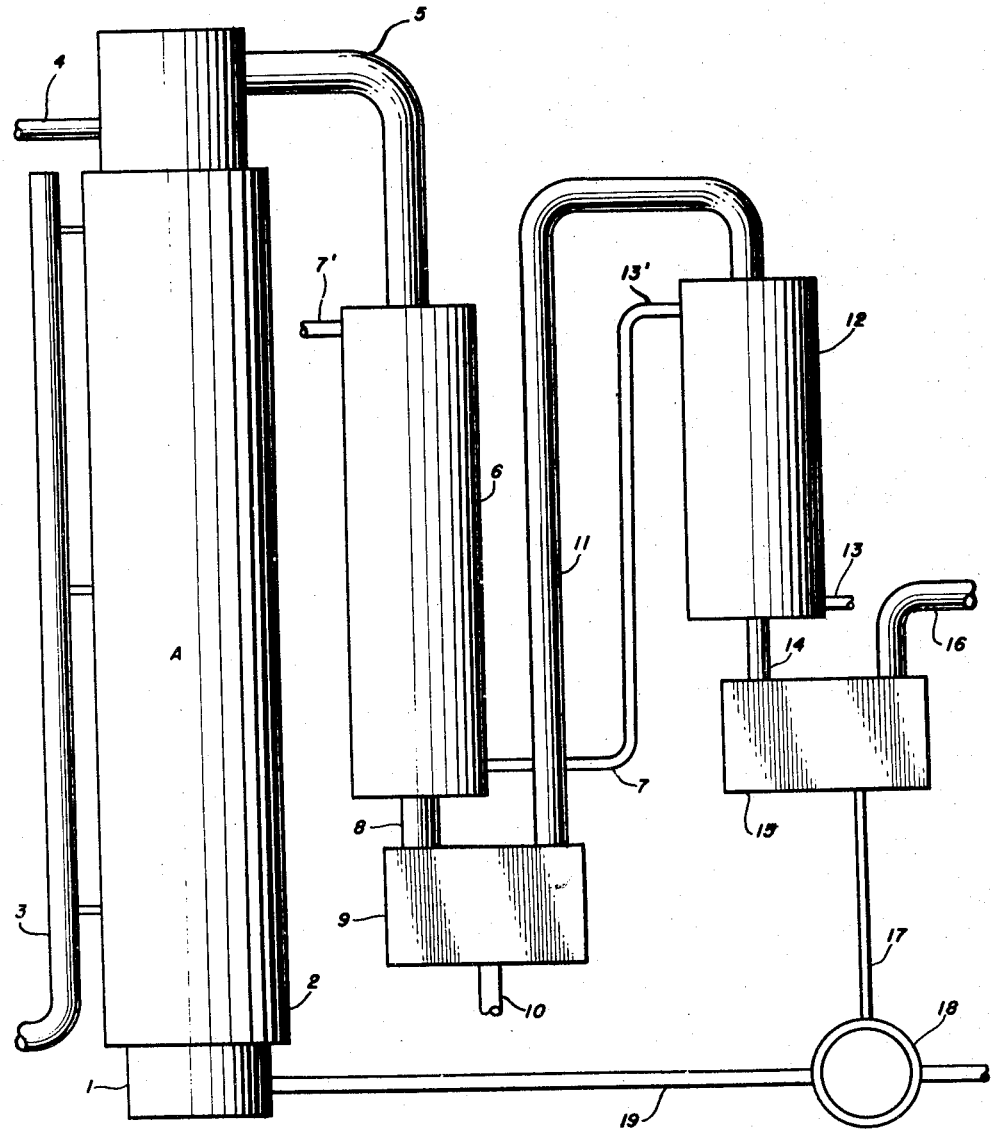
INVENTOR
GEORGE G. ZAHM
by Alfred W. Petraey
attorney Patented Oct. 5, 1948

2,450,774

UNITED STATES PATENT OFFICE 2,450,774

METHOD FOR THE EVAPORATION AND CONCENTRATION OF LIQUIDS

George G. Zahm, Buffalo, N. Y., assignor to Hurd Corporation, New York, N. Y., a corporation of Delaware Application August 12, 1943, Serial No. 498,360

3 Claims. (Cl. 99—205)

This invention relates in general to methods for the evaporation and concentration of liquids and more particularly food products such as fruit juices and the like.

It has been found in connection with the present invention that by passing liquids such as juices and beverages very rapidly through a zone in which such liquid is subjected to evaporative conditions, it is possible to obviate any substantial impairment or loss of the vitamins and other nutritive elements.

It has also been found in connection with the present invention, that the highly volatile esters and essential oils which contribute materially to the flavor, taste and aroma of the natural juice are ordinarily lost during concentration for the reason that such esters and oils are particularly susceptible to "steam distillation" and will, therefore, be carried away from the liquid by the water vapor.

It is therefore one of the principal objects of the present invention to provide methods for rapidly concentrating or evaporating liquid food products so as to avoid impairing, destroying or losing the vitamins, flavor-producing ingredients and other component substances within the liquid.

It is another and very important object of the present invention to provide methods for the evaporation and concentration of liquid food products whereby the esters and other flavoring constituents normally lost during evaporation may be efficiently recovered and restored to the concentrate, thereby preserving, unharmed and unchanged, the original and natural qualities of aroma and taste normally present in fresh unprocessed liquids.

The above and other objects will become more fully apparent from the following specification, which by way of illustration rather than limitation, sets forth preferred processes and preferred forms of apparatus constituting embodiments of the present invention, the scope of which is defined in the appended claims.

In the drawings (one sheet):

Fig. 1 is a schematic view of a preferred form of apparatus embodying the present invention.

Referring now in more detail and by reference characters to the drawings, A designates an evaporating column comprising a central vertical tube 1, constructed of stainless steel, copper-bronze or other suitable material, due consideration being given to the corrosive tendencies or other chemical properties of the particular liquid food product being processed. The tube 1 is externally surrounded by a cylindrical steel steam jacket 2 provided with a steam manifold 3 connected to any conventional source or supply of live steam (the latter not being shown).

Entering into the upper end of the tube 1 is a supply line 4 connected to a conventional holding tank (not shown) for introducing into column A the unprocessed liquid such as fresh natural fruit juice for example. The tube 1 is interiorly provided with any suitable type of distributing means for causing the incoming liquid to flow downwardly over the inner face of the tube 1 in a thin, uninterrupted, rapidly moving film. Connected to and leading out of the upper end of the tube 1 is a large vapor line or pipe 5 which is in turn connected at its other end to the upper end of a water-jacketed fractionating primary condenser 6, provided with cooling-water inlet and outlet pipes 7, 7' respectively. At its lower end the primary condenser 6 discharges through an outlet pipe 8 into a receiver 9 which is provided with a discharge line 10 through which condensate may be withdrawn by any suitable eduction means (not shown) and discarded.

Opening at its lower end into the receiver 9 is a vertical vapor line 11 connected to the upper end of a water-jacketed secondary condenser 12, which is in turn provided with cooling-water inlet and outlet pipes 13, 13' respectively, the latter being preferably connected to the cooling-water inlet pipe 7 of the primary condenser 6. At its lower end the condenser 12 is provided with a discharge line 14 connected at its lower end to a receiver 15 having a vacuum line 16 for connection to a suitable vacuum pump (not shown). At its lower end the receiver 15 discharges through a line 17 to one inlet of a mixing valve 18 which is connected at its other inlet to a concentrate discharge line 19 leading out of the lower end of the tube 1. At its outlet the mixing valve 18 is connected to conventional pasteurizing, can-filling and cooling apparatus (not shown). It will of course be understood that the can-filling apparatus will include suitable apparatus for withdrawing the concentrate from the subatmospheric pressure of the evaporating apparatus and delivering it to filling mechanism at atmospheric pressure or any other pressure for which such filling mechanism may be designed.

In operation the liquid is rapidly drawn through the line 4 into the tube 1 of evaporating column A at relatively high velocity and is caused to flow over the inner face of the tube 1 in a thin substantially continuous sheet or film. In effect the inner face of the tube 1 is covered with a very thin tubular sheath of liquid moving at high velocity. Simultaneously, steam at suitable temperature and pressure is admitted to the steam jacket 2 through manifold 3, so as to heat the tube 1 uniformly throughout its length and heat the liquid passing through the tube to approximately 120° F.

By means of a suitable vacuum pump (not shown) a relatively high vacuum (approximately 29" of mercury) is imposed on the liquid and the concentrate discharged through the line 19 to the mixing valve 18.

Meanwhile, the vapor produced in the column A containing a very large proportion of the esters and flavor-producing ingredients of the liquid, is drawn through the vapor line 5 and fractionally condensed in the primary or fractionating condenser 6, under temperature conditions which will result in the condensation of approximately 95% by volume of the vapor. It has been found that this ratio of condensate will contain very little, if any, of the esters and other flavor-producing ingredients. The watery condensate is discharged from the receiver 9 through the waste line 10 while the uncondensed vapor, now very rich in ester content passes through the line 11 into the secondary condenser 12 wherein it is finally condensed to produce a very highly concentrated ester fraction which is collected in the receiver 15 and is ultimately reincorporated with the concentrate in the mixing valve 18.

It will, of course, be evident that when the apparatus is first put into operation the initial concentrate may have to be discarded or allowed to accumulate for a few minutes until the ester fraction begins to come over and accumulate in the receiver 15. Thereafter, however, the operation may be continuous for as long a period as fresh liquid is available, barring accidents, breakdowns and similar fortuitous circumstances.

By reason of the very high vacuum and low temperature employed, the liquid can be concentrated without impairment or destruction of vitamins and other nutrient substances. At the same time the highly volatile, delicate esters and other flavor-producing substances are almost immediately pulled out of the liquid as it enters the column A and the ensuing process of rapid, fractional condensation and reflux concentrations recovers such esters and related substances in unchanged form for restoration to the concentrate, thereby preventing any material loss of natural flavor or aroma.

It should be understood that changes and modifications both in the methods as well as in the form, construction, arrangement and combination of the several parts of the apparatus for evaporating or concentrating liquids may be made and substituted for those herein shown and discussed without departing from the nature and principle of the present invention.

I claim:

1. The method of concentrating liquid food products such as fruit juices, beverages, extracts and infusions, which method comprises rapidly flowing the liquid food product in a thin film over a heat exchange surface under high vacuum and thereby separating said liquid food product into a concentrate portion and a vapor portion containing volatile flavor producing ingredients, passing said vapor portion directly into a first condenser without breaking the vacuum and thereby initially reducing the water content of the vapor portion without materially condensing the flavor-producing constituents, passing the residual vapors directly into a surface condenser without breaking the vacuum and thereby finally condensing substantially all of the residual vapors to form a concentrated liquid fraction containing the flavor producing constituents, and re-introducing said liquid fraction into the concentrate portion thereby restoring to such concentrate portion the flavor producing ingredients originally therein present.

2. The method of concentrating liquid food products such as fruit juices, beverages, extracts and infusions, which method comprises rapidly flowing the liquid food product in a thin film over a heat exchange surface at a temperature of less than 130° F. under high vacuum and thereby separating said liquid food product into a concentrate portion and a vapor portion containing volatile flavor producing ingredients, passing said vapor portion directly into a first condenser without breaking the vacuum and thereby initially reducing the water content of the vapor portion without materially condensing the flavor-producing constituents, passing the residual vapors directly into a surface condenser without breaking the vacuum and thereby finally condensing substantially all of the residual vapors to form a concentrated liquid fraction containing the flavor producing constituents, and re-introducing said liquid fraction into the concentrate portion thereby restoring to such concentrate portion the flavor producing ingredients originally therein present.

3. The method of concentrating liquid food products such as fruit juices, beverages, extracts and infusions, which method comprises rapidly flowing the liquid food product in a thin film over a heat exchange surface under high vacuum and thereby separating said liquid food product into a concentrate portion and a vapor portion containing volatile flavor producing ingredients, passing said vapor portion directly into a first condenser without breaking the vacuum and thereby initially reducing the water content of the vapor portion without materially condensing the flavor-producing constituents, passing the residual vapors directly into a surface condenser without breaking the vacuum and thereby finally condensing substantially all of the residual vapors to form a concentrated liquid fraction containing the flavor producing constituents, re-introducing said liquid fraction into the concentrate portion thereby restoring to such concentrate portion the flavor producing ingredients originally therein present, and pumping the re-combined concentrate portion and liquid fraction out to atmospheric pressure.

GEORGE G. ZAHM.

REFERENCES CITED

The following references are of record in the file of this patent:

UNITED STATES PATENTS

| Number | Name | Date |
|---|---|---|
| 48,268 | Gale | June 20, 1865 |
| 440,752 | Barotte | Nov. 18, 1890 |
| 510,734 | Trageser | Dec. 12, 1893 |
| 1,189,127 | Kellogg | June 27, 1916 |
| 1,619,826 | Marx | Mar. 8, 1927 |
| 2,098,961 | Fronmuller | Nov. 16, 1937 |
| 2,104,415 | Davies | Jan. 4, 1938 |
| 2,145,395 | Horvath | Jan. 31, 1939 |
| 2,156,212 | Wendt | Apr. 25, 1939 |
| 2,217,261 | Stevens | Oct. 8, 1940 |